April 15, 1941.  H. F. CRAMER  2,238,309

MEAT COOKER

Filed May 29, 1939  2 Sheets-Sheet 1

Inventor:
Harold F. Cramer
By Martin E. Anderson
Attorney

Patented Apr. 15, 1941

2,238,309

UNITED STATES PATENT OFFICE 2,238,309

MEAT COOKER

Harold F. Cramer, Los Angeles, Calif.

Application May 29, 1939, Serial No. 276,294

4 Claims. (Cl. 53—5)

This invention relates to improvements in meat cookers and has reference more particularly to a meat cooker designed with particular reference to carrying out the method of high temperature cooking described and claimed in the application of Edward W. Brooks, Serial No. 236,144, filed October 20, 1938.

In the above entitled application a method has been described in which meat, and more particularly steaks, are subjected to a very high temperature for a short period which temperature has been found to produce results that were unexpected and highly desirable.

It has been found that if raw meat is subjected to a temperature of about 1600 degrees F. and not over 2200 degrees F. for a comparatively short time, the cooking is effected in such a way that the meat becomes exceptionally tender and juicy. As described in the application above identified, upon introduction of a piece of raw meat into an oven maintained at a temperature between the limits above mentioned, the outer surface is first seared and sealed against the escape of fats and juices, and following this the nuclei of cells are expanded by the sudden application of heat, thereby stretching the cell walls and increasing their size before the cell walls have had time to harden and while they are therefore still elastic. Meat cooked in this manner retains its juices and flavor to a greater extent than when cooked with the ordinary low temperature methods.

It is the object of this invention to produce an oven or furnace which has been designed for the purpose of carrying out the method above identified.

The invention and its manner of use and operation will now be described in detail and for this purpose reference will be had to the accompanying drawings in which the invention has been illustrated in its preferred form, and in which.

Figure 1:
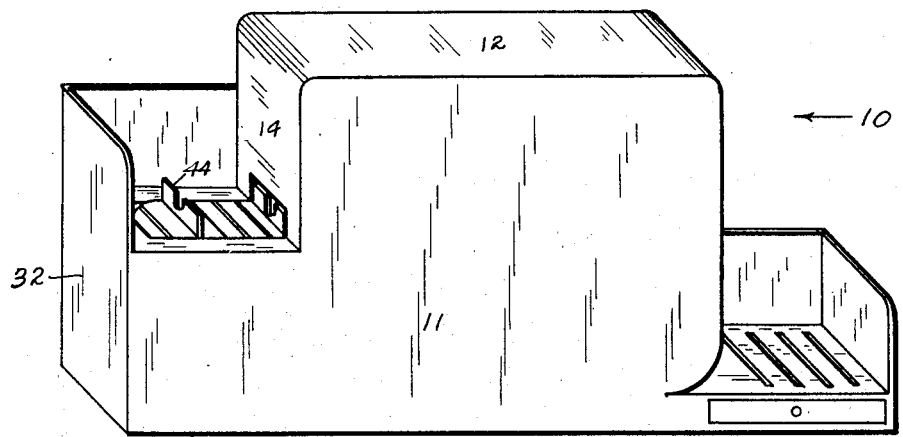
Figure 1 is a perspective view of the cooker.
Figure 3:
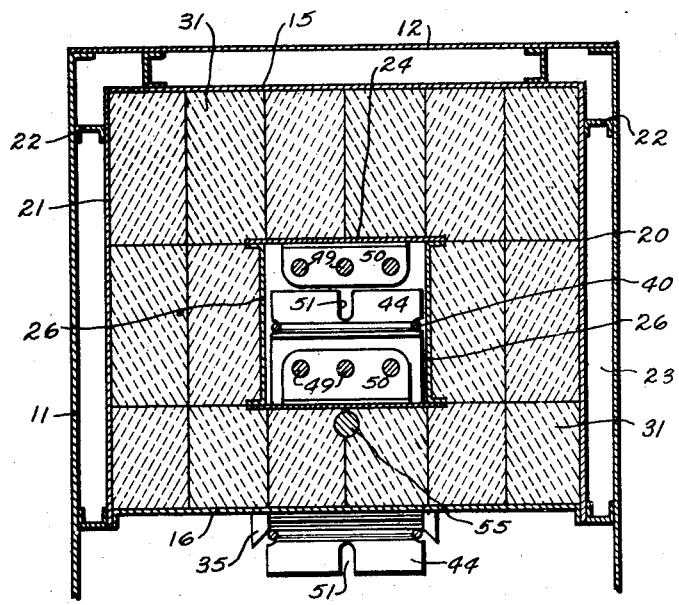
Figure 3 is a transverse section taken on line 3—3, Figure 2.

In the drawings reference numeral 10 designates the bottom of the cooker, while reference numeral 11 represents the front side thereof. The top has been designated by reference numeral 12 and this is preferably integral with the ends 13 and 14. The cooker which is enclosed in the casing whose outside is shown in Figure 1, consists of a metal housing having a top 15 and a bottom 16, which are connected by an end 17 and another end formed by plates 18 and 19. The sides of the housing, which are shown in Figure 3, are formed by plates 20 and 21. The substantially box-like housing thus formed is positioned within the casing forming the outside thereof and is spaced from the interior of the latter by means of spacers 22, which serve to hold the housing in a predetermined position. These spacers are preferably short U-shaped members which do not obstruct the circulation of air in the heat insulating space thus formed. Since there is no opening from the air space 23, the air will not circulate due to the temperature it reaches and therefore the heat loss will be reduced to a minimum.

Figure 2:
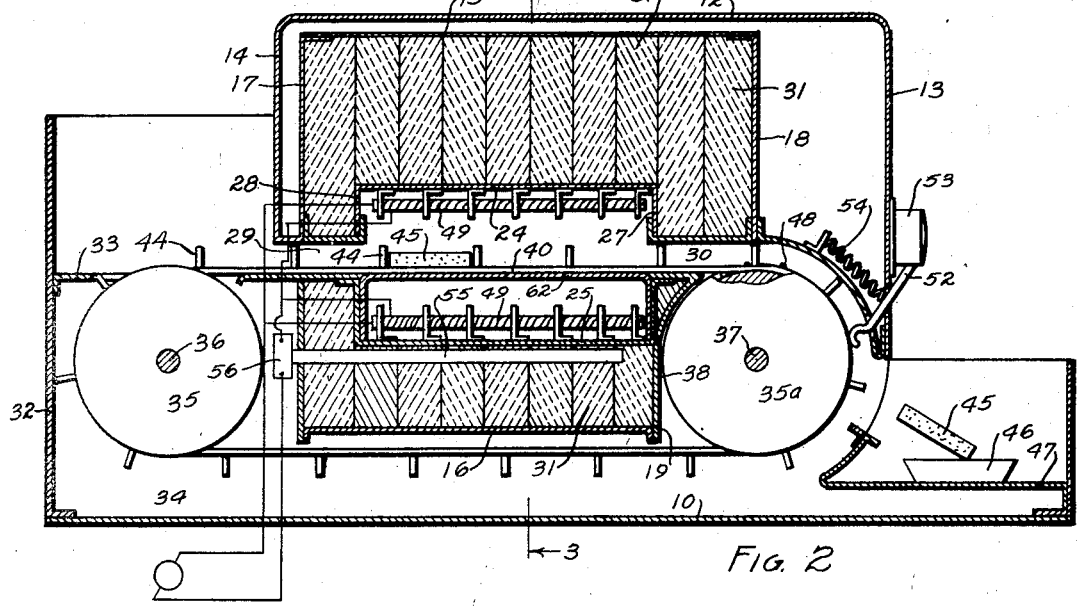
Figure 2 is a longitudinal, vertical section taken on line 2—2, Figure 3.
Figure 8:
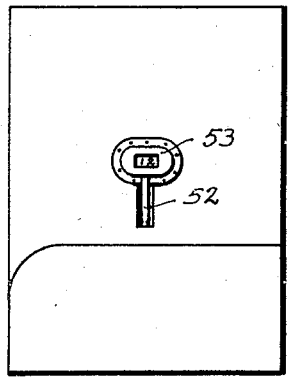
Figure 8 is an end view looking in the direction of arrow 10, Figure 1.

Referring now more particularly to Figures 2 and 3, it will be seen that a chamber is formed substantially central of the housing. The walls of this chamber are formed by metal plates of highly refractory material, preferably some such material as that sold under the name of "Nichrome" or "Silachrome." In the embodiment shown in Figure 2, the top wall of the cooking chamber has been designated by reference numeral 24 and the bottom by reference numeral 25. The top and the bottom plates are connected by vertical side members 26 in the manner indicated in Figure 3. This forms a chamber having a substantially rectangular cross section, and in the embodiment shown in Figure 2, end walls 27 and 28 are also provided. The end walls have openings that extend from the cooking chamber to the outside of the casing. The opening designated by reference numeral 29 will be referred to as the inlet, while that designated by reference numeral 30 will be referred to as the outlet opening. It will be seen from Figure 2 that the inlet and outlet openings are substantially midway between the top and bottom plates, although the particular location is not of any great consequence. Surrounding the walls of the cooking chamber and filling the space between the plates enclosing this chamber and the outer walls of the housing is a body of heat insulating material and in the embodiment shown this material has been indicated as formed from brick-like sections 31. The material employed is composed principally of diatomaceous earth, but any other suitable refractory material having low heat conductive properties may be used.

By referring to Figures 2 and 3 it will be seen that the cooking chamber is surrounded by comparatively thick walls of refractory heat insulating material so that the heat losses are thereby reduced to a minimum. Experience has shown that with a device constructed in the manner shown and above described, a temperature within the cooking chamber of between 1600 and 2000 degrees F. may be maintained indefinitely without raising the temperature of the plates surrounding the insulating material to a point that cannot be borne by the hand.

The enclosing casing extends beyond the housing containing the cooking chamber at both ends and the end wall 32 with the top plate 33 forms a chamber 34 in which is positioned a sprocket wheel or roller 35 that is mounted for rotation about the axis of a shaft 36. At the outlet end of the cooking chamber another roller 35a is mounted for rotation about a shaft 37. It will be observed that the end wall of the housing which contains the heat insulating material and which has been designated by reference numeral 38 is curved towards the top so as to fit more snugly against the outer periphery of sprocket 35a. One of these sprockets is turned in a clockwise direction when viewed, as in Figure 2, by means of an electric motor, which has not been shown because the driving of any mechanism by an electric motor is not a matter that involves invention.

Figure 4:
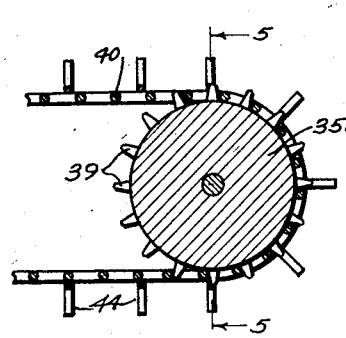
Figure 4 is a section through one of the sprocket rollers, taken on line 4—4, Figure 5.
Figure 5:
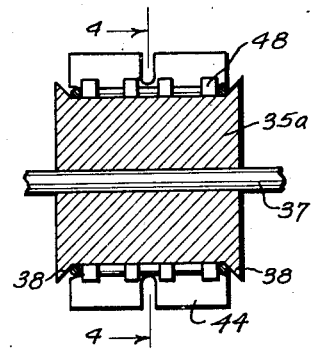
Figure 5 is a diametrical section taken on line 5—5, Figure 4.

Referring now to Figures 4 and 5 where a diametrical and a transverse section of the sprocket 35a has been shown, it will be seen that the sprocket there illustrated is provided with outwardly extending flanges 38 at each end thereof and that it has a plurality of sprocket teeth 39 spaced to cooperate with the conveyor belt, which has been designated by reference numeral 40. The conveyor may be made in any suitable manner, but in Figure 6, a short section of conveyor has been illustrated and this is formed from a plurality of links 41 whose ends 42 are transversely and then inwardly curved and terminate in eyes 43 that enclose the transverse bar of the next adjacent link. These conveyors must be made of refractory material and are preferably made from such material as "Nichrome" or "Silachrome" above mentioned. In the embodiment illustrated in Figure 2, the conveyor has been provided with upwardly extending plates 44 that are spaced apart a distance slightly less than the length of the inlet opening. The heighth of these plates is such that they come close to the top plate of the inlet opening but do not touch the latter and they therefore serve to maintain the inlet opening closed against the escape of heat from the cooking chamber. Meat, such as a piece of steak, which has been designated by reference numeral 45 in Figure 2, is positioned between adjacent plates 44 and is carried by the conveyor through the cooking chamber and through the outer opening 30 and is finally deposited onto a plate or other receiving vessel 46 positioned on the supporting surface 47. The sprocket wheels or rollers 35a are preferably provided with sprocket teeth 48 that extend through the conveyor belt a sufficient distance to loosen any steak or meat that may adhere to the conveyor structure. Owing to the fact that the conveyor cools in passing from sprocket 35a back to sprocket 35, the material is sometimes cooled sufficiently to cause the meat to adhere and when this occurs the releasing action of the sprocket teeth 48 is a great convenience.

It has been found that when temperatures above 1600 degrees F. are maintained in the cooking chamber, an ordinary steak will be thoroughly cooked in the short period of eleven seconds and the parts are therefore adjusted so as to maintain this speed when such temperatures are employed. The timing is effected by means of a speed reduction gear, either forming part of the motor, or interposed between the motor and the sprocket wheel rotated thereby. This has not been shown because it is a matter that comes within the province of mechanical skill and shop practice.

For the purpose of heating and maintaining the temperature of the cooking chamber at whatever height desired, a plurality of electric heating elements 49 have been provided and these are located, a part in the top and part in the bottom of the cooking chamber. In the embodiment illustrated six heating elements have been shown, three of which are supported by the bottom plate 25 and three suspended from the top plate 24. The heating elements are supported by brackets 50 secured to the top and bottom of the cooking chamber in the manner shown in Figures 2 and 3 and these are provided with holes through which the heating elements extend. From Figure 3, it will be seen that the plates 44 are provided with central notches 51 and it might be explained at this point that the purpose of these notches is to receive the arm 52 of a mechanical counter 53. The arm 52 is biased towards sprocket 35a by means of the spring 54 and whenever this is moved outwardly by a piece of meat carried by the conveyor, it will register on the counter. The notches 51 prevent the counter from registering except when the arm is affected by means of a piece of meat and in this way an accurate count can be made of the number of steaks or other pieces of meat that pass through the cooking device.

Positioned in an opening in the refractory heat insulating material 31 is a pyrometer 55 which may be of any standard or approved form and which serves to open and close a switch position in the housing 56 that is carried by the end of the pyrometer.

Figure 7:
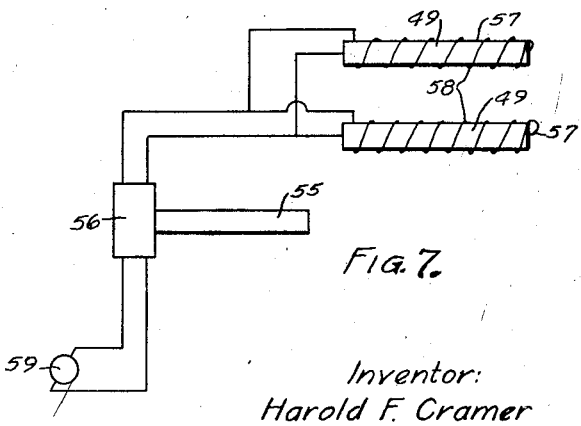
Figure 7 is a wiring diagram showing one way of connecting the heating elements to the sources of electric supply and for controlling the same.

Referring now more particularly to Figure 7, it will be seen that the electric heating elements there illustrated are formed from tubes 57 of highly refractory material on which are wound coils of electric resistance wire 58 such as that employed in flat irons and stoves of different kinds, and which may be either "Nichrome" or "Silachrome," but may also be formed from any other suitable highly refractory material having high coefficients of electrical resistivity. Numeral 59 designates a source of electrical current and may represent the ordinary light and power circuits provided in all cities. The switch that controls the flow of current to the electrical heating elements and which is positioned within the housing 56, opens and closes the circuit in accordance with the temperature to which the pyrometer is exposed and this is adjusted so that the temperature is maintained at the value desired.

In Figures 4 and 5 the sprocket wheels have been shown as formed from roller-like members, but they may be constructed in any other way and may resemble an ordinary belt pulley with the exception of the outer surfaces. Since the heat where these sprocket wheels are located is never very high, no special material needs to be employed. The teeth 35 serve a double function, one being to positively cooperate with the conveyor and the other to loosen any meat from the conveyor that might be stuck thereon. In order to prevent any meat juices from dropping onto the heating elements that are positioned below the conveyor, a plate 62 is provided that extends over the heating elements and protects them against such meat drippings.

From the above description, taken in connection with the drawings, it will be apparent that I have provided an automatic meat cooking device that is particularly well adapted for use in the process above identified, but it may be used with lower temperatures and operated at other speeds to cook other food products.

Figure 6:
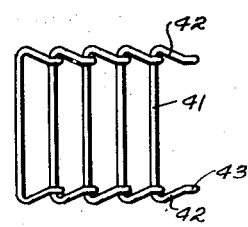
Figure 6 is a plane view showing a section of one type of conveyor.

The specific manner in which the conveyor is constructed is not material to the invention and the embodiment illustrated in Figure 6 is merely an example of one type of conveyor that may be employed for this purpose.

Having described the invention what is claimed as new is:

1. A meat cooking device comprising, in combination, a casing, a housing positioned therein and spaced therefrom, the housing having a compartment therein, the interior of the compartment being separated from the interior of the housing by a partition, the interior of the compartment being in communication with the outside of the housing through two aligned passages the passages forming inlet and outlet openings for an endless conveyor passing through the compartment, the compartment projecting above and below the inlet and outlet openings to provide spaces for electric heaters.

2. A meat cooking device for use in a method of high temperature meat cooking process, compressing a housing formed from sheet metal, an elongated compartment positioned in the housing, the end walls of the compartment having openings that are in communication with the outside of the housing through passageways, one forming the inlet and the other the outlet, the centers of the openings being substantially coaxial with the center of the compartment, the inlet and outlet openings providing passageways for an endless conveyor extending through the compartment, the top and the bottom of the compartment being positioned above and below the inlet and outlet openings to provide spaces for electric heating elements.

3. A meat cooking device comprising, in combination, a casing, a housing positioned therein and spaced therefrom, the housing having a compartment therein, the interior of the compartment being separated from the interior of the housing by a partition, the interior of the compartment being in communication with the outside of the housing through a passage, the passage forming an inlet opening for a conveyor passing therethrough and into the compartment, the compartment projecting above and below the inlet opening to provide spaces for electric heaters.

4. A meat cooking device comprising, a housing having a compartment therein, the interior of the compartment being separated from the interior of the housing by a partition, the interior of the compartment being in communication with the outside of the housing through a passage forming an inlet opening for a conveyor passing therethrough and into the compartment, the compartment extending above and below the inlet opening to provide spaces for electric heaters.

HAROLD F. CRAMER.